United States Patent Office 3,241,589
Patented Mar. 22, 1966

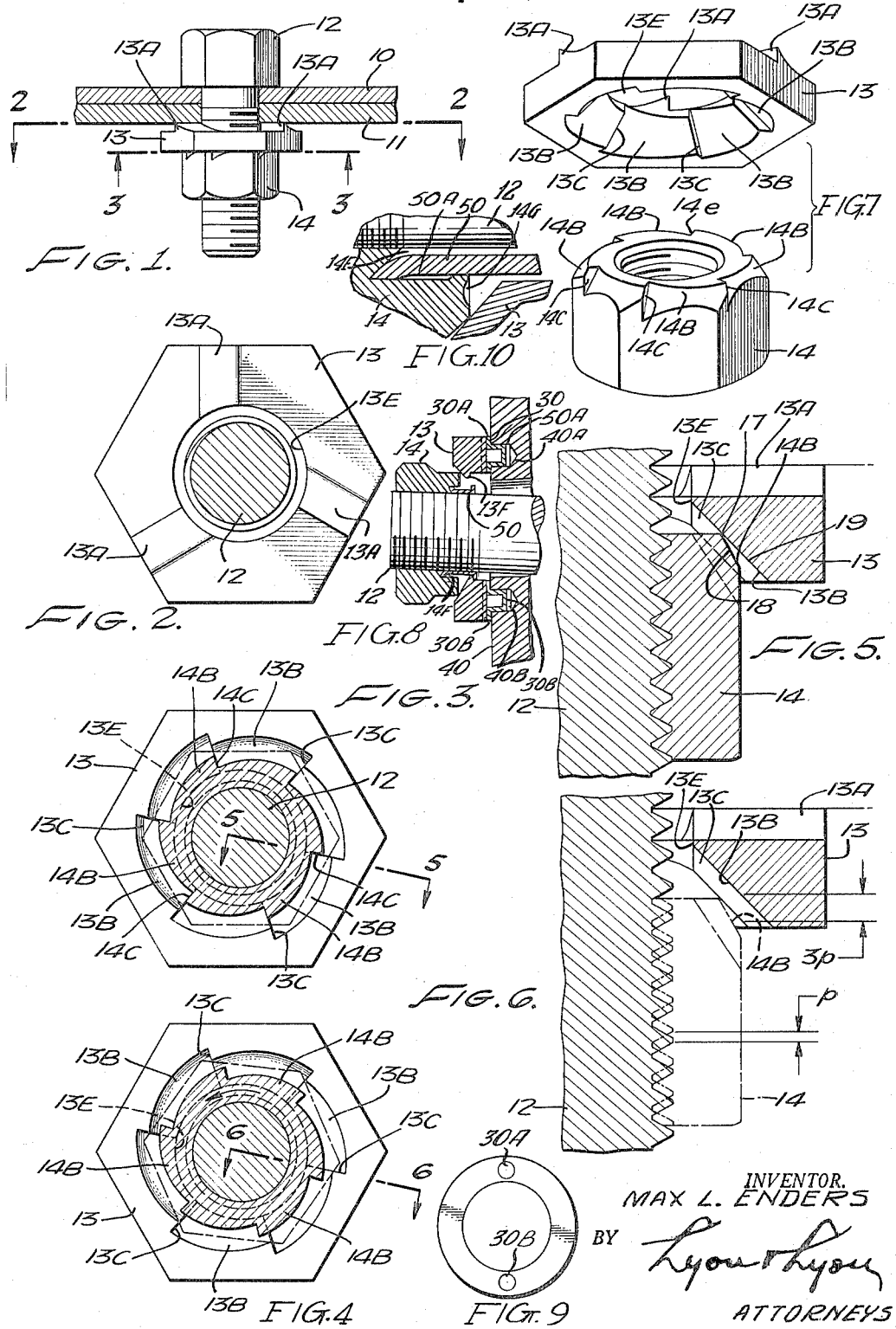

3,241,589
POSITIVE SELF-LOCKING FASTENING MEANS
Max L. Enders, 965 N. Fair Oaks, Pasadena, Calif.
Filed Sept. 14, 1964, Ser. No. 398,830
4 Claims. (Cl. 151—34)

The present application is a continuation-in-part of my application Ser. No. 841,788, filed Sept. 23, 1959, now abandoned in favor of the present application.

The present invention relates to fastening means used in conjunction with a threaded element such as a conventional bolt for fastening various parts together.

Briefly, the present invention contemplates the provision of a novel nut and washer elements having cooperating ratchet-like faces which are locked together when the nut is turned in its tightening direction and the washer also has a work-engaging side defined by a plurality of circumferentially spaced barbs for accomplishing a novel coaction and particularly an arrangement wherein the nut is prevented from moving in the untightening direction, once the same has been tightened, by vibration forces or other forces applied directly to the nut.

It is therefore an object of the present invention to provide improved fastening means for accomplishing the features stated generally above.

A specific object of the present invention is to provide an improved nut and washer combination having the capabilities of being self-locking and which when tightened can not be loosened by applying a torque to the nut.

Another specific object of the present invention is to provide an improved nut and washer arrangement of this character which may be made inexpensively using present-day mass production methods.

Another specific object of the present invention is to provide an arrangement of this character comprising a nut and a washer in which both the nut and washer are provided with flat surfaces to allow convenient application of a turning force thereto applied, for example, by a conventional wrench, the wrench being applied to the nut for tightening and to the washer when it is desired to untighten the assembly.

Another specific object of the present invention is to provide an improved fastening structure of this character comprising, besides the conventional threaded element such as a bolt, only a single washer and a single nut with cooperating ratchet-like faces between the washer and the nut and with the "rise" or "pitch" of the cooperating cam-like ratchet faces being greater than the pitch of the threads on the nut.

Another specific object of the present invention is to provide a fastening assembly of this character featured by the fact that unlike other assemblies using a lock washer or nut which depends on the development of friction forces between itself and a bolt in the nature of a friction drag and thus does not allow a true torque to be indicated by a torque wrench in the tightening operation, the present assembly allows the use of a torque wrench for fastening with the indications on the torque wrench being true indications of the tightening torque.

Another specific object of the present invention is to provide a positive self locking arrangement which is not critical with respect to the elastic limit of the bolt material and thus has universal applicability to bolts of all materials and more important allows the bolt to be stressed to the end of its elastic limit and indeed beyond its elastic limit and without subsequent danger of the arrangement from becoming loosened under prolonged vibration.

Another specific object of the present invention is to provide a positive self locking arrangement characterized by its lightness.

Another specific object of the present invention is to provide an improved locking arrangement which allows full tightening and stressing of a bolt.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 discloses an assembly embodying features of the present invention.

FIGURES 2 and 3 are generally sectional views taken respectively along the lines 2—2 and 3—3 in FIGURE 1.

FIGURE 4 is a view like FIGURE 3 but is more illustrative of the manner in which the nut may move with respect to the washer.

FIGURE 5 is a sectional view taken generally along the line 5—5 of FIGURE 3.

FIGURE 6 is a sectional view taken along the line 6—6 of FIGURE 4 and is more illustrative of the relationship of the pitch of the screw thread with respect to the "rise" or "pitch" of the cooperating cam surfaces between the nut and the washer.

FIGURE 7 is a perspective view of both the washer and nut incorporated in the assembly shown in FIGURE 1.

FIGURE 8 illustrates a modified form of the present invention and also illustrates the balanced pressure feature of the arrangements in FIGURES 5 and 6.

FIGURE 9 is a plan view of a washer used in the assembly in FIGURE 8.

FIGURE 10 is an enlarged view of a portion of the structure shown in FIGURE 8.

FIGURE 1 illustrates one of the more simple clamping arrangements in which the nut and washer illustrated in FIGURE 7 may be used to clamp, for example, two metal plates 10 and 11 together. These plates 10 and 11 have aligned apertured portions through which a conventional bolt 12 passes with the head of the bolt engaging the upper plate 10. The lower plate 11 is engaged by the washer 13 which is held in tightening engagement by the nut 14 threaded on the bolt 12.

The washer 13, as perhaps best seen in FIGURES 1, 2 and 7, has its work-engaging side defined by a plurality of integrally formed and circumferentially arranged projections 13A in the form of shouldered barbs. These barbs 13A extend generally radially outwardly from the centrally apertured portion of the washer 13 and have a so-called unidirectional characteristic in that these barbed projections 13A allow relatively easy movement of the washer 13 in the tightening direction but engage the surface of the plate 11 to provide a considerable amount of resistance to movement in the untightening direction; and, in fact, these barbs 13A dig into the surface of the plate 11 to prevent untightening of the assembly as described in more detail later.

While the washer 13 is illustrated as having only three of such shouldered barbs 13A, more than three of such shouldered barbs may be provided.

The other side of the washer 13 is generally centrally dished to provide an inner circumferential surface and such surface is further modified to provide six equally spaced cam portions 13B which are engageable with an equal number of similar cam-shaped portions 14B integrally formed on the end of nut 14.

It is noted further that the rising cam-like surfaces 13B and 14B on the washer and nut respectively terminate in corresponding shouldered portions 13C and 14C. These cooperating shouldered portions 13C and 14C engage when the nut is moved in its tightening direction; and when there is a tendency for the nut 14 to move in the untightening direction, there is a tendency for relative movement between the washer and the nut with the cooperating cam surfaces 13B and 14B in such case contacting each other. In other words, when and as the nut 14 is moved in its tightening direction, the cooperating shoulders 13C and 14C engage each other so that the washer moves with the nut but when the nut 14 moves or tends to move in the untightening direction, these shouldered portions 13C and 14C move or tend to move out of engagement with each other and the nut is cammed or tends to be cammed away from the washer in the axial direction of the nut. This particular coaction is of importance as explained in more detail below.

In operation of the arrangement illustrated in connection with FIGURE 1, the bolt 12 is passed through the aligned apertured portions of the plates 10 and 11 and the nut 14 is threaded on the bolt with the shouldered barbs 13A of the washer facing the surface of the plate 11.

When and as the nut 14 is moved in its tightening direction, the cooperating shoulders 13C and 14C of the washer and nut respectively are brought into engagement and the washer 13 turns with the nut 14. The nut 14 continues to be turned until the barbs 13A securely engage the plate 11. A torque wrench may be used for this purpose to apply a predetermined amount of torque to the nut 14. In use of the assembly thus tightened, it will be observed that the arrangement is self-tightening in response to either vibrational forces or forces applied to the nut 14 itself in the untightening direction. This is due to the cam action between the washer and nut provided by the cooperating cam surfaces 13B and 14B of the washer and nut. Thus, assuming that one attempts to untighten the nut 14 by applying an unloosening force directly thereto, the cooperating cam surfaces 13B and 14B cam the nut 14 in its axial direction, i.e. along the axis of the bolt 12. The amount of such camming movement is correspondingly greater than the pitch of the thread on which the bolt 12 is threaded, this being illustrated in connection with FIGURES 4 and 6 wherein the pitch of the thread is represented by the letter $p$ and the rise or so-called pitch of the cam surfaces is at least three times the pitch of the thread and is represented as $3p$. Thus, when the nut tends to move in its axial direction a distance corresponding to $p$, the washer 13 tends to move a distance at least three times as great, i.e. $3p$, in the direction of the plate 11 to produce a greater binding engagement between the shouldered barbs 13A thereon and the adjacent surface of the plate 11. In other words, the nut 14 is locked against tightening.

It has been found that if an attempt is made to untighten the assembly by applying greatly excecssive turning force directly to the nut 14, parts of the assembly, i.e. the nut or the washer or the bolt, fracture, thus demonstrating the locking feature of the invention.

It has been found, however, that the assembly may be unloosened by applying a turning force directly to the washer 13 in the untightening direction until the washer and nut become disengaged, after which they may be removed; and for that purpose the washer is provided with at least one flat surface and preferably six flat surfaces as shown herein to allow convenient application of the wrench thereto for untightening purposes. This is the only way the fastening means described may be released without damage.

Preferably this washer 13, as shown in FIGURE 5, has a central opening 13E sufficiently enlarged so that the washer 13 may self-center itself without binding with the bolt 12 and more important to allow the washer 13 to move in its radial direction when the nut 14 is tightened to equalize forces developed in the tightening direction, i.e. the washer 13 may shift radially in response to unequalized forces to equalize forces.

While the drawings show rising cam-like surfaces 14B terminating in shouldered portions 14C on the nut 14, it will be understood that alternatively the underside of the head of bolt 12 may be formed in like manner, in which case the washer 13 is placed between the bolt head and the work piece 10. In this case the work piece 11 is tapped to receive the threaded portion of the bolt so modified.

Also, it will be understood that when a left-hand thread is used instead of the conventional right-hand thread shown in the drawings, the cams on the nut and washer and the barbs on the washer extend in a direction opposite to that illustrated in the drawings.

As illustrated in FIGURES 5 and 6, the cam surfaces on the nut, typified by the cam surface 14B in FIGURE 5, contacts the adjacent cam surface 13B on the washer on a line contact 17 and the washer 13 is sufficiently smooth so that it may slide freely in a lateral direction when and as it is being pressed by the nut to equalize unbalanced forces. It is noted as above the apertured portion of the washer is sufficiently enlarged for such lateral movement. By these means the washer moves laterally in response to unbalanced forces to a position wherein the forces become balanced. For these purposes, for example, the line 18 defining the surface 14B may be 30° with respect to the axis of the bolt and the line 19 defining the washer surface 13B extends at a different and greater angle of 45° with respect to the bolt axis.

Tests have shown that under conditions assimilating vibrational conditions the washer barbs 13A increasingly penetrate into the work piece as a result of the camming action between the washer and nut cam surfaces 13B and 14B and thus, as taught above, the pitch of these cam surfaces 13B and 14B relative to the pitch of the nut thread is such that this barb penetration into the work piece may continue without disengagement of these cammed surfaces at the shouldered portions 13C and 14C. In other words if the pitch of these cam surfaces were not as taught herein or if these cam surfaces were not sufficiently long as taught herein, the assembly would loosen itself under vibration or periodic application of forces to the assembly because the barbs would then penetrate further into the work to such an extent that, under these assumed conditions, the cam surfaces would disengage at the shouldered portions 13C, 14C.

The present arrangement has the further advantage that it may be used without relation to the elastic limit of the bolt material, i.e., the bolt may be stressed to the extent of its elastic limit and indeed beyond its elastic limit thereby allowing use of maximum tightening forces.

As mentioned previously, once the assembly is tightened, it is impossible to loosen the same by applying torque to the washer element and in accordance with important features of the present invention the washer element is provided with one or more external flat surfaces whereby torque may be applied to the washer for loosening purposes.

In such loosening process the barbs have a tendency to disfigure the work piece and in accordance with other features a special washer illustrated in FIGS. 8 and 9 is used in those instances where such disfigurement is not desired.

As seen in FIGURE 9, the washer 30 is provided, preferably with two or more dimpled portions 30A, 30B which are initially fitted into corresponding preformed apertured portions 40A, 40B in the work piece 40, these dimpled portions and apertured portions cooperating to prevent relative movement between themselves both during fastening and subsequent use of the assembly. In this case the washer 30 is of softer material than the washer element 13 to allow penetration of the washer barbs 13A; and after loosening of the assembly by applying a turning force to the washer element 13, the washer 30 may be replaced by a like washer 30 without disfigurement or production of localized stresses in the work piece 40.

FIGURE 8 illustrates also an annular keeper 50 for loosely retaining the washer and nut elements 13 and 14 together prior to a fastening operation to obviate the possibility that a careless worker may assemble these two elements incorrectly. For this purpose the washer element 13 is provided with an internal shouldered portion 13F and the nut element 14 is provided with an annular grooved portion 14F within which one straight end 50A of the keeper 50 is deformed as shown in FIGURE 10 to be loosely retained by a burnished edge portion 14G of nut 14, the other end of the keeper 50 being provided with a hooked portion as shown in FIGURE 8 to cooperate with the washer shouldered portion 13F. This keeper 50 thus loosely retains the washer and nut elements, together without interfering with their camming action when the assembly is tightened or without producing interference during the loosening operation when a turning force is applied to the washer element 13.

While the particular embodiments of the present invention have been shown and described it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A fastening assembly comprising a clamped member, a bolt passing through said clamped member, a nut threaded on said bolt, a washer between said bolt and said clamped member, the thread on said bolt having a pitch, said washer having a dished portion defined by a ratchet-like surface which tapers both circumferentially and radially, said nut having a ratchet-like surface on the end thereof cooperating with the ratchet-like surface of said washer, said cooperating ratchet-like faces on the washer and nut each having shouldered portions which are engageable upon rotation of said nut in its tightening direction, said cooperating surfaces on said washer and nut comprising cammed surfaces which are tapered both radially and circumferentially and which upon untightening movement of the nut produce relative movement between the nut and washer in the axial direction a greater distance than the corresponding pitch of the thread, said cooperating surfaces on said washer and nut being sufficiently raised and prolonged to prevent their disengagement when said nut is turned in an untightening direction, and said washer having a plurality of circumferentially arranged barbed shoulders engaging and digging into said member when said washer tends to move in the untightening direction, said washer having a centrally apertured portion contiguous with and coaxial with said dished portion, said apertured portion being substantially larger than the diameter of said bolt for radial movement with respect to said bolt when the same is being cammed by said nut to thereby move the washer radially to equalize forces thereon, the engaging surfaces on said nut and washer being inclined at different angles with respect to the axis of said bolt and engaging on a line contact to produce less interlocking between the nut and said washer than between said washer and said member engaged by said barbed shoulders, the inclination of the nut engaging surface on said washer relative to the axis of said bolt being greater than the inclination of the cooperating and washer engaging surface of said nut.

2. A fastener assembly for clamping a member, a bolt for passing through said member, a nut threaded on said bolt, a washer for disposition between said bolt and said member, the thread on said bolt having a pitch, said washer having a dished portion defined by a ratchet-like surface which tapers both circumferentially and radially, said nut having a ratchet-like surface on the end thereof cooperating with the ratchet-like surface of said washer, said cooperating ratchet-like faces on the washer and nut each having shouldered portions which are engageable upon rotation of said nut in its tightening direction, said cooperating surfaces on said washer and nut comprising cammed surfaces which are tapered both radially and circumferentially and which upon tightening movement of the nut produce relative movement between the nut and washer in the axial direction a greater distance than the corresponding pitch of the thread, said cooperating surfaces on said washer and nut being sufficiently raised and prolonged to prevent their disengagement when said nut is turned in an untightening direction, and said washer having a plurality of circumferentially arranged barbed shoulders disposed to engage and dig into said member when said washer tends to move in the untightening direction, said washer having a centrally apertured portion contiguous with and coaxial with said dished portion, said apertured portion being substantially larger than the diameter of said bolt for radial movement with respect to said bolt when the same is being cammed by said nut to thereby move the washer radially to equalize forces thereon, the engaging surfaces on said nut and washer being inclined at different angles with respect to the axis of said bolt and engaging on a line contact to produce less interlocking between the nut and said washer than between said washer and said member engaged by said barbed shoulders, the inclination of the nut engaging surface on said washer relative to the axis of said bolt being greater than the inclination of the cooperating and washer engaging surface of said nut.

3. A fastener assembly as set forth in claim 2 in which said washer has a peripheral flat portion for engagement by a turning tool.

4. A fastener assembly as set forth in claim 2 including a second washer for disposition between said barbed shoulders and said member whereby said barbed shoulders may then engage and dig into said second washer instead of into said member, and a second washer having a protuberance for engagement with a cooperating portion of said member to prevent rotation of said second washer on said member when said second washer is engaged by said barbed shoulders.

References Cited by the Examiner

UNITED STATES PATENTS

| 1,729,705 | 7/1930 | McGee | 151—34 |
| 2,783,810 | 3/1957 | Wrigley | 151—34 |

FOREIGN PATENTS

| 684,466 | 11/1939 | Germany. |
| 7,116 | 5/1886 | Great Britain. |
| 6,425 | 5/1888 | Great Britain. |
| 107,352 | 1/1917 | Great Britain. |
| 111,778 | 12/1917 | Great Britain. |
| 514,923 | 11/1939 | Great Britain. |
| 730,343 | 5/1955 | Great Britain. |

EDWARD C. ALLEN, *Primary Examiner.*